United States Patent [19]

Ohira et al.

[11] 4,138,271
[45] Feb. 6, 1979

[54] PROCESS FOR PREPARING CARAMEL

[75] Inventors: Toshiaki Ohira, Sagamihara; Eisuke Hara, Yokohama; Yasuo Takagi, Kawasaki, all of Japan

[73] Assignee: Ajinomoto Co., Inc., Tokyo, Japan

[21] Appl. No.: 842,252

[22] Filed: Oct. 14, 1977

[51] Int. Cl.$^2$ .......................... C13L 1/08; C13L 1/10; A23G 3/00
[52] U.S. Cl. ....................................... 127/34; 426/540
[58] Field of Search ..................... 127/34, 36, 71, 70; 426/540

[56] References Cited

U.S. PATENT DOCUMENTS

| | | | |
|---|---|---|---|
| 1,316,019 | 9/1919 | Daniel | 127/34 |
| 2,582,261 | 1/1952 | Longenecker | 127/34 |
| 2,767,108 | 10/1956 | Fetzer | 127/36 X |
| 3,137,592 | 6/1964 | Protzman | 127/71 |
| 3,214,294 | 10/1965 | Meisel | 127/34 |
| 3,385,733 | 5/1968 | Ackerman | 127/34 |
| 3,528,853 | 9/1970 | Pelton | 127/71 |
| 4,025,657 | 5/1977 | Cheng | 127/71 X |

*Primary Examiner*—Sidney Marantz
*Attorney, Agent, or Firm*—Oblon, Fisher, Spivak, McClelland & Maier

[57] ABSTRACT

A process for preparing coloring caramel from a pre-gelatinized starch or dextrin. The process comprises preparing a pre-gelatinized starch or dextrin having a specified moisture content and having a specified acidic pH value and extruding it at an elevated temperature and pressure condition effective to caramelize it.

The extruded caramel product may be pulverized to yield a powdered caramel.

6 Claims, No Drawings

PROCESS FOR PREPARING CARAMEL

The present invention relates to a process for preparing brown coloring agent caramel by extruding a pre-gelatinized starch or a dextrin at elevated temperatures and pressures with a heatable extruder.

Recently, the use of synthetic coloring agents has been avoided at from a standpoint of their safety problem, while caramel is a well-known material used in many industries as a natural coloring agent and it appears as a promising substitute therefor at the present time.

Caramel has been prepared from cane sugar syrup and other carbohydrate syrup by controlled heat treatment. Often a small amount of an acidic or alkaline catalyst is added while heating to promote caramelization. Subsequently the resulting high concentrated caramel is neutralized and diluted with water.

This conventional process is wet and batchwise and unsatisfactory with respect to the operation management, efficiency and yield of the product. Furthermore, it is difficult to maintain the quality of the finished product because there is a danger of forming undesirable insoluble resinous products and generating burnt colouration (sugar charcoal). Therefore, a great extent of skill is required in the operation procedure in order to obtain a satisfactory product.

Many attempts have been made to solve these technical problems, but the effort has been principally directed to the development of new catalysts and the improvement of heating conditions. No one has sought other new techniques not employing monosaccharides or disaccharides such as glucose, cane sugar or lactose syrup as raw material. Also, although the demand for powdered caramel tends to increase with the spread of instant foods, powdered caramel is expensive owing to the application of spray drying.

It is, therefore, an object of the present invention to provide a simple and convenient process for preparing caramel having a uniform quality.

It is another object of this invention to provide a novel continuous process for preparing caramel from raw material available inexpensively and in large amounts, without employing monosaccharides or disaccharides such as glucose, cane sugar or lactose.

It is a further object of this invention to provide a process for preparing a powdered caramel without application of spray drying.

The object of this invention may be accomplished by a process for preparing caramel which comprises:

A. admixing a pre-gelatinized starch or a dextrin with water and an acidic reagent in an amount sufficient to provide a total moisture content of from about 10 percent to about 30 percent by weight and to give a pH of from about 1.5 to about 4.0, B. extruding the mixture at temperatures of from about 150° C. to 280° C. and pressures of from about 2Kg/cm$^2$ to about 50Kg/cm$^2$ with a heatable extruder and if necessary C. pulverizing the extrudate aggregated upon cooling.

Although a wide variety of equipments can be employed to accomplish the above extrusion step, there can advantageously be used a heatable extruder having a rotating compression or compaction screw within a closed heatable barrel and a temperature controllable, restricted extrusion die, nozzle or orifice at the front end of the barrel.

The caramelization of the pre-gelatinized starch or dextrin by the extruder is considered to be accomplished progressively by the following mechanisms.

1. the raw material fed to the extruder is transported, compressed and heat-exchanged
2. converted into molten state by heating
3. degraded to low molecular-weight molecules by heating at elevated temperatures and pressures and by shearing force
4. caramelized by heating at elevated temperatures and pressures, and
5. dehydrated and dried when extruded under reduced pressure.

The extruded caramel product may be crushed or ground to any particle size desired whereby a powdered caramel is obtained.

In the process of the present invention, pre-gelatinized starch or dextrin is first moistened with a suitable amount of water and then adjusted to a pH of about 1.5–4.0 with an acidic reagent. Examples of suitable acidic reagents include organic acids such as formic acid, acetic acid, propionic acid, citric acid, malic acid, fumaric acid and tartaric acid; and mineral acids such as hydrochloric acid and sulfuric acid. Of course, these acids may be in advance added to water to be admixed with pre-gelatinized starch or dextrin in prescribed amount so as to give a pH range between about 1.5 to about 4.0 when admixed with pre-gelatinized starch or dextrin.

If the moistened pre-gelatinized starch or dextrin adjusted to a pH of about 1.5–4.0 has been prepared, it is continously fed to an extruder in portions given and extruded at temperatures and pressure conditions effective for caramelization. The extrudate emerging from the extruder may be further pulverized according to the demand.

The process of the present invention is not limited to any particular type of pre-gelatinized starch or dextrin. Any type of pre-gelatinized starch or dextrin may be employed. Usually, pre-gelatinized starch is obtained by heating an aqueous slurry of raw starch and drying the resulting paste. Another raw material dextrin may be one having a dextrose equivalent (DE) of below about 30 and it is usually obtained hydrolyzing raw starch with acid or enzyme (amylase).

Both pre-gelatinized starch and dextrin may be easily caramelized by the extrusion process of the present invention, while direct caramelization of raw starch by a one step extrusion process is entirely insufficient.

The process of the present invention may be directly applied to any type of pre-gelatinized starch or dextrin prepared by a process hitherto known, but it is industrially advantageous to prepare dextrin from raw starch by an extrusion process which is disclosed in Japanese Patent Application No. 48388/1975 which was laid open to public inspection under No. 123254/1976. The process involves adding moisture to raw starch, adjusting its pH to acidic values below 5 and extruding it at elevated temperatures and pressures to produce dextrin. Starch sources are not particularly limited. Preferred pre-gelatinized starch is one derived from potato starch, tapioka, sweet potato starch or waxy corn starch.

The moisture content in the raw material to be fed to the extruder may be varied with the kind of raw material, heating condition and pH, it should be within a range of from about 10 percent to about 30 percent by weight, and preferably within a range of 12 percent to 20 percent by weight, from the standpoint of workability including ease of feeding and load of extruder. To prepare the desired product having a uniform quality, the pH of the raw material should be adjusted to be within a range of about 1.5 to 4.0 and preferably a range of 2.8 to 3.5. However, optimum pH is adequately selected depending on the degree of colouration and colour strength and other characteristic properties required in the finishing product. This may be readily determined experimentally.

At pH levels above 4, the product has a tendency to become partially insoluble while a pH below 1.5 makes it difficult to neutralize the resulting product.

It is possible to improve the quality of the product by blending into the raw material prior to extrusion colour adjusting agents normally employed such as ammonium salts, sulfite, alkali earth metal salts, amino acids, monosaccharides, cane sugar.

Also, the temperature and pressure conditions are essential in practice of the present process and are principally governed by the moisture content in the raw mateial, barrel temperature, screw speed, size of nozzle and the compression ratio of the screw. Heating is required during the extrusion (between the feeding zone of the raw material in the extruder and extrusion die). In general, the extrusion temperature is maintained within a range of about 150° C. to about 280° C. and preferably within a range of 180° C. to 230° C. When heating is conducted at above 280° C., a part of the product carbonizes and becomes insoluble.

As to the extrusion pressure, it should be at least 2Kg/cm$^2$. Usually it is maintained within a range of 2Kg/cm$^2$ to 50Kg/cm$^2$.

The staying time required until the raw material fed to the extruder is extruded as caramel product may be varied depending on the screw speed, size and length of nozzle and the amount fed of the raw material, but it is desirable to set the staying time to be within 1 minute to 10 minutes and preferably within 3 minutes to 5 minutes. Too long staying time at high temperature causes unnecessary carbonization and makes it difficult to control the quality of the product.

The quality of the product may be optionally changed by selecting the treatment conditions, and various grades and varieties of caramels may be prepared depending on the intended use.

The caramel product extruded from the extrusion die aggregates or solidifies upon cooling and is crushed or ground with a shock grinder to yield powdered caramel which has less hygroscopic property.

The present invention is further illustrated by the following examples.

EXAMPLE 1

Dextrin for use as raw material was prepared from the commercial waxy corn starch ("MD" a product of Ajinomoto Co., Inc.) by the following extrusion process.

There was prepared waxy corn starch having a moisture content of 25% by weight and having a pH of 3.5 by the addition of 1.5% sulfuric acid.

The moistened waxy corn starch was extruded in a laboratory Brabender extruder having a barrel (375mm in length and 19mm in diameter).

The extruder has a round die containing a 3mm diameter nozzle. The extrusion temperature was maintained 50° C. at the feeding zone and from 125° to 150° C. at intermediate zone and the round die. Speed of 3:1 compression ratio screw was 100 rpm. and the pressure developed at the round die was 20Kg/cm$^2$ to 30Kg/cm$^2$. The extruded dextrin was pulverized to a coarse powder. It has a dextrose equivalent of 3.0 After the dextrin was remoistend to 25% of water content and was adjusted to pH 3.5 with 0.5% sulfuric acid, it was charged continuously into the extruder above mentioned.

The operating conditions for caramelization were as follows.

A short pipe (300mm in length and 5mm in diameter) was attached at the top end of the extruder in order to promote caramelization in 4-5 minutes. The extrusion temperature was maintained at 190°-220° C. Speed of 3:1 compression ratio screw was 20 rpm. and the pressure developed at the round die was at 3Kg/cm$^2$.

Caramel product ejected from the extruder became aggregated from molten state as the temperature decreased. The aggregated caramel was pulverized by a shock type pulverizer. This product (A) had characteristics as shown in Table 1.

EXAMPLE 2

Powdered dextrin as in Example 1. and cane sugar were mixed in a ratio of 10:1 by weight. The mixture was moistened to 25% of water content and was adjusted to pH 3.5 by the addition of 0.5% sulfuric acid. Then the moistened mixture was extruded in the Brabender extruder under the same condition as in Example 1.

The extruded caramel product was allowed to stand at room temperature for 30 minutes and the aggregated product was pulverized with a shock grinder. This caramel product (B) has characteristics as shown in Table 1.

EXAMPLE 3

As starting material, commercial dextrin ("Pinedex #1" a product of Matzutani Chemical Inc.) having a dextrose equivalent of 7-8, was used. It was moistened to have 25% water content and pH 3.0 by the addition of 1% sulfuric acid.

This moistened dextrin was charged into the extruder and caramelized under the same condition as in Example 1. Quality of this caramel product (C) is as shown in table 1.

EXAMPLE 4

Commercial pre-gelatinized starch ("Amycol H" a product of Nichiden Chemical Inc.) and cane sugar were mixed in a ratio of 10:1 by weight. The mixture was moistened to have 25% of water content and adjusted to pH 2.8 with 1.5% sulfuric acid.

It was charged into the extruder and carmelized under the following conditions.

In this case a static mixer (200mm in length and 15mm in diameter) was attached between the extruder and a short pipe to promote caramelization. The extrusion temperature was maintened at 200°-230° C.

Speed of 3:1 compression ratio screw was 20 rpm. and the pressure developed at the round die was at 3Kg/cm$^2$.

Caramel product (D) had characteristics as shown in Table 1.

Table 1

| Quality         Product | A   | B   | C   | D   |
|---|---|---|---|---|
| Moisture content (%) | 3.0 | 2.4 | 3.4 | 3.3 |

Table 1-continued

| Product Quality | A | B | C | D |
|---|---|---|---|---|
| pH*[1] | 3.3 | 3.3 | 3.1 | 2.9 |
| State of solution*[2] | transparent | " | " | " |
| Carbohydrate content (%) (as glucose) | 86.2 | 74.2 | 71.5 | 81.0 |
| Color; transmittance*[3] | | | | |
| at 470 mμ | 0.244 | 0.368 | 0.302 | 0.355 |
| 500 | 0.172 | 0.268 | 0.216 | 0.249 |
| 530 | 0.144 | 0.196 | 0.155 | 0.188 |
| 570 | 0.082 | 0.134 | 0.121 | 0.122 |
| 610 | 0.054 | 0.096 | 0.072 | 0.088 |
| Color strength*[4] | 0.666 | 1.062 | 0.866 | 1.002 |

Note:
*[1] 10g/dl
*[2] 1.0g/dl
*[3] Transmittance of the solution (0.1 g/dl) with a spectrophotometer at wave length indicated.
*[4] Total value at 470, 500, 530, 570 and 610 mμ.

What we claim is:

1. A process for preparing a caramel product which comprises admixing a pre-gelatinized starch or a dextrin with water and an acidic reagent in an amount sufficient to provide a total moisture content of from about 10% to about 30% by weight and to give a pH of from about 1.5 to 4.0 and extruding the mixture at an elevated temperature and pressure through an orifice into a substantially atmospheric environment, whereby the mixture is caramelized.

2. A process as in claim 1, wherein the extrusion is conducted at temperatures of from about 150° C. to about 280° C. and at pressures of from about 2Kg/cm$^2$ to about 50Kg/cm$^2$.

3. A process as in claim 1, wherein said pre-gelatinized starch is one derived from potato starch, tapioca, sweet potato starch or waxy corn starch.

4. A pocess as in claim 1, wherein said dextrin is one having a dextrose equivalent below about 30.

5. A process as in claim 1, wherein said acidic reagent is sulfuric acid.

6. A process for preparing a caramel product which comprises
   A. forming a moistened pre-gelatinized starch or dextrin having a moisture content of from 10% to about 30% by weight and having a pH of from about 1.5 to 4.0
   B. extruding the moistened pre-gelatinized starch or dextrin at an elevated temperature and pressure through an orifice into a substantially atmospheric environment, whereby the mixture is caramelized, and
   C. pulverizing the extruded and aggregated caramel product.

* * * * *